United States Patent
Noguchi et al.

(10) Patent No.: US 10,815,382 B2
(45) Date of Patent: Oct. 27, 2020

(54) STAIN DISAPPEARING LAMINATE, AND IMAGE DISPLAY DEVICE AND AUTOMOBILE COMPONENT USING SAID STAIN DISAPPEARING LAMINATE

(71) Applicant: NISSAN MOTOR CO., LTD., Yokohama-shi, Kanagawa (JP)

(72) Inventors: Yuji Noguchi, Kanagawa (JP); Ryou Murakami, Kanagawa (JP); Toshiya Shibukawa, Kanagawa (JP)

(73) Assignee: NISSAN MOTOR CO., LTD., Yokohama-shi, (JP)

( * ) Notice: Subject to any disclaimer, the term of this patent is extended or adjusted under 35 U.S.C. 154(b) by 0 days.

(21) Appl. No.: 16/339,618

(22) PCT Filed: Oct. 7, 2016

(86) PCT No.: PCT/JP2016/080024
§ 371 (c)(1),
(2) Date: Apr. 4, 2019

(87) PCT Pub. No.: WO2018/166142
PCT Pub. Date: Apr. 12, 2018

(65) Prior Publication Data
US 2019/0233657 A1    Aug. 1, 2019

(51) Int. Cl.
*C09D 5/00* (2006.01)
*B32B 7/02* (2019.01)
(Continued)

(52) U.S. Cl.
CPC .......... *C09D 5/00* (2013.01); *B32B 7/02* (2013.01); *C03C 17/3405* (2013.01);
(Continued)

(58) Field of Classification Search
CPC ..... Y10T 428/24273; Y10T 428/24281; Y10T 428/24289; Y10T 428/24298;
(Continued)

(56) References Cited

U.S. PATENT DOCUMENTS

| 5,225,274 A * | 7/1993 | Ogawa | B05D 1/185 |
| | | | 428/333 |
| 5,324,543 A * | 6/1994 | Ogawa | B05D 1/185 |
| | | | 427/387 |

(Continued)

FOREIGN PATENT DOCUMENTS

| CN | 104024175 A | 9/2014 |
| CN | 105026466 A | 11/2015 |

(Continued)

*Primary Examiner* — Maria V Ewald
*Assistant Examiner* — Ethan A. Utt
(74) *Attorney, Agent, or Firm* — Foley & Lardner LLP (57) ABSTRACT

A stain disappearing laminate of the present invention comprises a sebum absorption and diffusion layer 3 and a sebum attachment inhibition layer 2 laminated on a base material in this order. The sebum attachment inhibition layer 2 repels sebum 5 and reduces attachment of the sebum, as well as allows attached sebum to pass through to the sebum attachment inhibition layer side, and the sebum absorption and diffusion layer 3 absorbs the sebum 5 passed through the sebum attachment inhibition layer 2 and diffuses the sebum within the sebum absorption and diffusion layer itself.

12 Claims, 5 Drawing Sheets

(51) Int. Cl.
| | |
|---|---|
| *C09D 183/10* | (2006.01) |
| *C09D 133/12* | (2006.01) |
| *C09D 171/00* | (2006.01) |
| *C09D 183/04* | (2006.01) |
| *C03C 17/34* | (2006.01) |
| *C08G 77/04* | (2006.01) |
| *C08G 77/442* | (2006.01) |

(52) U.S. Cl.
CPC ......... *C09D 133/12* (2013.01); *C09D 171/00* (2013.01); *C09D 183/04* (2013.01); *C09D 183/10* (2013.01); *C03C 2217/76* (2013.01); *C03C 2217/77* (2013.01); *C08G 77/04* (2013.01); *C08G 77/442* (2013.01)

(58) Field of Classification Search
CPC ..... Y10T 428/24306; Y10T 428/24314; Y10T 428/24322; Y10T 428/24331; Y10T 428/24339; Y10T 428/24355; Y10T 428/24364; Y10T 428/24802; Y10T 428/24942; Y10T 428/2495; Y10T 428/24967; Y10T 428/24975; Y10T 428/26; Y10T 428/261; Y10T 428/263; Y10T 428/264; Y10T 428/265; Y10T 428/266; Y10T 428/268; Y10T 428/269; Y10T 428/27; Y10T 428/273; Y10T 428/3154; Y10T 428/31544; Y10T 428/31663; Y10T 428/31667; Y10T 428/31855; Y10T 428/31935; Y10T 428/25; Y10T 428/258; Y10T 428/259; B32B 3/00; B32B 3/10; B32B 3/14; B32B 3/16; B32B 3/24; B32B 3/26; B32B 3/266; B32B 5/00; B32B 5/16; B32B 7/00; B32B 7/02; B32B 9/00; B32B 9/04; B32B 9/048; B32B 27/00; B32B 27/06; B32B 27/08; B32B 27/14; B32B 27/18; B32B 27/28; B32B 27/283; B32B 27/30; B32B 27/304; B32B 27/308; B32B 27/32; B32B 27/322; B32B 33/00; B32B 2255/00; B32B 2255/04; B32B 2255/10; B32B 2255/20; B32B 2255/24; B32B 2255/26; B32B 2264/00; B32B 2264/10; B32B 2264/102; B32B 2264/104; B32B 2264/12; B32B 2307/00; B32B 2307/40; B32B 2307/412; B32B 2307/70; B32B 2307/728; B32B 2307/73; B32B 2307/754; B32B 2457/00; B32B 2457/20; B32B 2457/202; B32B 2457/204; B32B 2457/206; B32B 2457/208; B32B 2605/00; B32B 2605/003; B32B 2605/006; B32B 2605/08; C09D 5/00; C09D 5/16; C09D 5/1606; C09D 5/1612; C09D 5/1618; C09D 5/1625; C09D 5/1637; C09D 5/1656; C09D 5/1662; C09D 5/1668; C09D 5/1675; C09D 5/1681; C09D 5/1687; C09D 5/1693; C09D 127/00; C09D 127/02; C09D 127/12; C09D 127/14; C09D 127/16; C09D 127/18; C09D 127/20; C09D 127/22; C09D 127/24; C09D 133/00; C09D 133/04; C09D 133/06; C09D 133/10; C09D 133/12; C09D 171/00; C09D 183/00; C09D 183/04; C09D 183/08; C09D 183/10; C09D 183/12; G02B 1/00; G02B 1/04; G02B 1/10; G02B 1/105; G02B 1/18
USPC .... 428/131–139, 141, 142, 195.1, 212, 213, 428/215, 216, 219, 220, 332–341, 421, 428/422, 500, 522, 323, 330, 331, 428/446–452; 106/2, 287.1, 287.27, 106/287.28
See application file for complete search history.

(56) References Cited

U.S. PATENT DOCUMENTS

| | | | | |
|---|---|---|---|---|
| 5,324,566 | A * | 6/1994 | Ogawa | B82Y 30/00 428/141 |
| 5,380,585 | A * | 1/1995 | Ogawa | C04B 41/009 428/333 |
| 5,466,486 | A * | 11/1995 | Ogawa | C04B 41/89 427/352 |
| 6,503,567 | B2 * | 1/2003 | Ogawa | B05D 1/185 427/341 |
| 6,521,334 | B1 * | 2/2003 | Ogawa | B05D 1/185 428/333 |
| 2001/0044021 | A1 * | 11/2001 | Ogawa | C03C 17/30 428/333 |
| 2002/0094375 | A1 * | 7/2002 | Ogawa | B82Y 30/00 427/164 |
| 2002/0127331 | A1 * | 9/2002 | Ogawa | B05D 1/185 427/163.1 |
| 2009/0041984 | A1 * | 2/2009 | Mayers | G02B 1/18 428/141 |
| 2012/0141695 | A1 | 6/2012 | Kakinuma | |
| 2014/0234635 | A1 | 8/2014 | Akao et al. | |
| 2015/0239023 | A1 * | 8/2015 | Iwata | B32B 27/18 428/141 |
| 2015/0240086 | A1 * | 8/2015 | Iwata | G02B 1/18 428/141 |
| 2015/0361233 | A1 * | 12/2015 | Sakashita | C08J 5/18 428/522 |

FOREIGN PATENT DOCUMENTS

| | | |
|---|---|---|
| CN | 105411336 A | 3/2016 |
| JP | 2007-297543 A | 11/2007 |
| JP | 2008-188925 A | 8/2008 |
| JP | 2015-217578 A | 12/2015 |
| WO | WO 2008/120505 A1 | 10/2008 |
| WO | WO 2011/013426 A1 | 2/2011 |
| WO | WO-2014115633 A1 * 7/2014 ............... C08J 5/18 |
| WO | WO 2015/190526 A1 | 12/2015 |

* cited by examiner

STAIN DISAPPEARING LAMINATE, AND IMAGE DISPLAY DEVICE AND AUTOMOBILE COMPONENT USING SAID STAIN DISAPPEARING LAMINATE

TECHNICAL FIELD

The present invention relates to a stain disappearing laminate, and an image display device and an automobile component using the stain disappearing laminate. More specifically, the present invention relates to a stain disappearing laminate that can eliminate light scattering caused by sebum, such as fingerprints, that is attached to a surface, to improve visibility.

BACKGROUND ART

On parts such as touch panels and displays of mobile phones that are directly touched by people as well as parts provided with aesthetic properties such as decorative panels, sebum stains are easily conspicuous, when sebum such as fingerprints and stains such as fingermarks are attached thereto, which cause light scattering.

Against the sebum stains on the touch panels or the like, a method is conventionally known of forming a coating film on the surface, which film has low water-repellent/oil-repellent properties with low surface free energy.

However, the attachment of sebum could not be completely inhibited even with the coating film with water-repellent/oil-repellent properties. Moreover, a contact angle of a slight amount of the sebum attached increases and light is scattered, thus causing a problem that the sebum stain stands out even more.

Patent Document 1 discloses a sebum absorption and diffusion film that makes sebum hardly noticeable by reducing the amount of the sebum on the film surface through absorption of sebum attached to a film surface into that film and diffusion of the sebum within the film.

CITATION LIST

Patent Document

Patent Document 1: WO2008/120505A

SUMMARY OF INVENTION

Technical Problem

However, the item disclosed in Patent Document 1 has high affinity for sebum. Thus, the amount of sebum attached to the film will increase, which will require time to make the sebum attached to the film surface absorbed and unnoticeable.

Moreover, since the amount of sebum attached is large, the sebum absorbable within the sebum absorption and diffusion film may easily saturate, and this makes it difficult to absorb and diffuse sebum for a long term.

The present invention is accomplished in view of such problems with the prior art, and an object of the present invention is to provide a stain disappearing laminate that can rapidly reduce scattering of light caused by sebum stains, and improve its visibility and aesthetic properties by reducing the scattering of light for a long term.

Solution to Problem

The present inventors, as a result of diligent study to achieve the above object, found that the object can be achieved by providing, on a surface, a sebum attachment inhibition layer that repels sebum and reduces the attachment of sebum as well as allows a slight amount of sebum attached to pass through to a sebum absorption and diffusion layer side, and accomplished the present invention.

Namely, the stain disappearing laminate of the present invention has a sebum absorption and diffusion layer and a sebum attachment inhibition layer laminated on a base material in this order.

The present invention is further characterized in that the sebum attachment inhibition layer repels sebum and reduces the attachment of the sebum, as well as allows the sebum attached to pass through to the sebum attachment inhibition layer side, and the sebum absorption and diffusion layer absorbs the sebum passed through the sebum attachment inhibition layer and diffuses it within the sebum absorption and diffusion layer itself.

Moreover, an image display device of the present invention is characterized in that it comprises the stain disappearing laminate on its surface.

Furthermore, an automobile component of the present invention is characterized in that it comprises the stain disappearing laminate on its surface.

Advantageous Effects of Invention

According to the present invention, the sebum attachment inhibition layer that reduces the attachment of sebum as well as allows a slight amount of sebum attached to pass through to the sebum absorption and diffusion layer side is provided on the surface. This makes it possible to provide a stain disappearing laminate that can rapidly reduce scattering of light caused by sebum stains, and can reduce the scattering of light for a long term to recover visibility and aesthetic properties.

DESCRIPTION OF THE EMBODIMENTS

Figure 1:
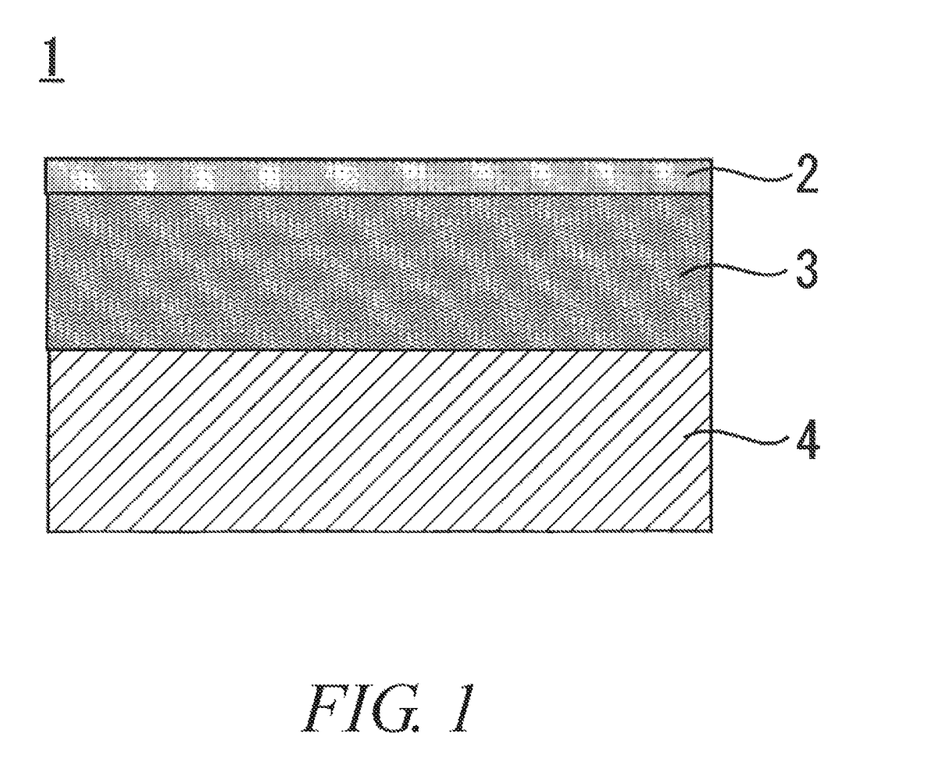
FIG. 1 is a cross sectional view showing an example of a stain disappearing laminate of the present invention.

A stain disappearing laminate of the present invention will be described in detail. The stain disappearing laminate 1 is a laminate that has a sebum absorption and diffusion layer 3 and a sebum attachment inhibition layer 2 laminated on a base material in this order, as shown in FIG. 1.

Sebum Attachment Inhibition Layer

Figure 2:
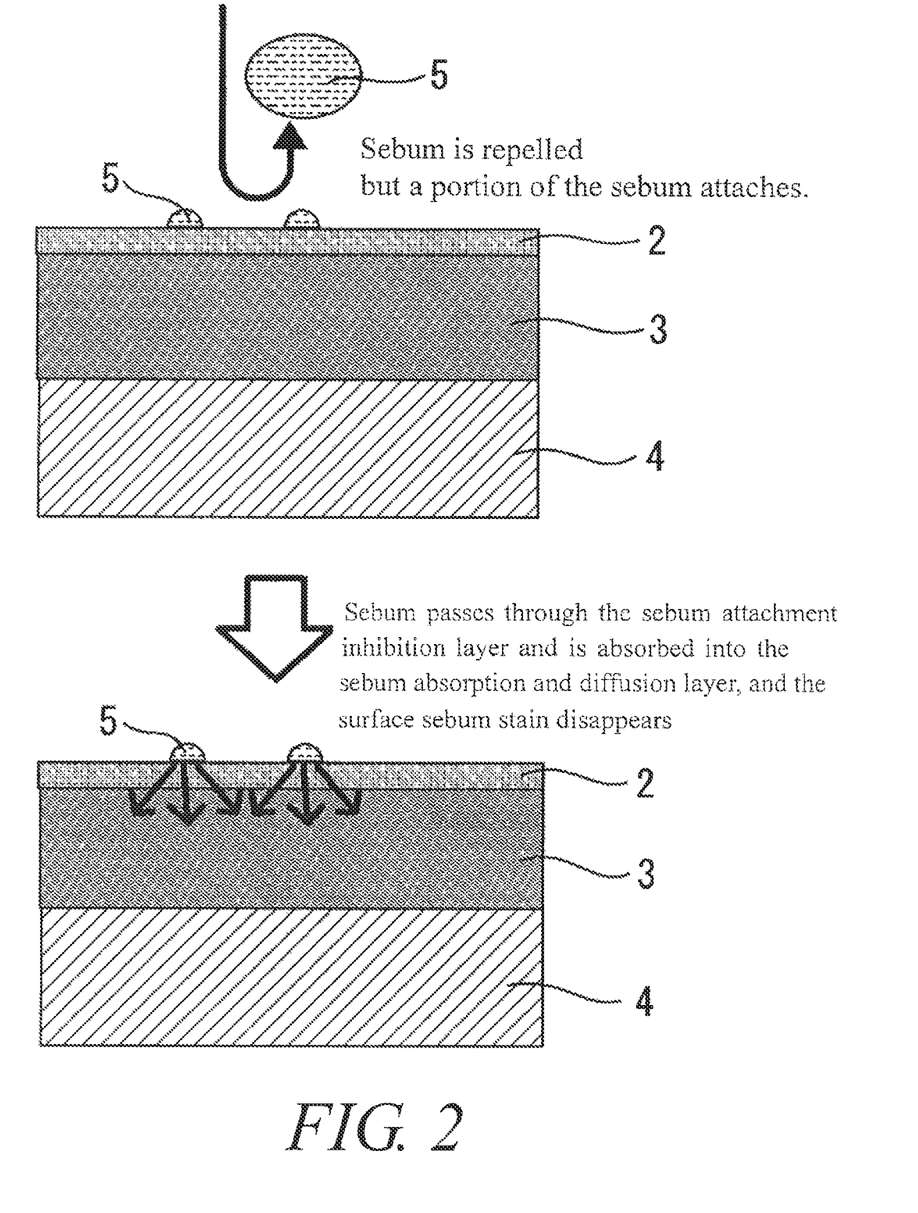
FIG. 2 is a diagram describing an effect of the stain disappearing laminate of the present invention.

The sebum attachment inhibition layer 2, as shown in FIG. 2, repels most of sebum 5 and reduces attachment of sebum 5 onto the stain disappearing laminate 1, while it also allows a slight portion of the sebum 5, that is not repelled and attached to the stain disappearing laminate 1, to pass through to the sebum absorption and diffusion layer 3 side.

Due to the sebum attachment inhibition layer, an amount of sebum attaching to the stain disappearing laminate can be reduced and scattering of light caused by sebum stains can be reduced rapidly and prevented for a long term. Therefore, it is possible to recover visibility and aesthetic properties.

Furthermore, it is possible to maintain slipperiness at the time of touching the stain disappearing laminate, and thus to improve operability and an operational feeling of a touch panel that employs the stain disappearing laminate.

The surface free energy of the sebum attachment inhibition layer is preferably 12 to 20 $mJ/m^2$. Since the surface free energy of sebum is around 30 $mJ/m^2$, the repellency and affinity for the sebum will be well-balanced by having the surface free energy of the sebum attachment inhibition layer in the above range. Therefore, not only attachment of sebum is reduced, but also sebum attached is passed through to the sebum absorption and diffusion layer side.

Namely, if the repellency of the sebum attachment inhibition layer for sebum is too high, sebum will not pass through and the sebum will tend to remain on the surface of the sebum attachment inhibition layer, and, on the other hand, if the affinity of the sebum attachment inhibition layer for sebum is too high, an amount of sebum attached increases.

The surface free energy of the sebum attachment inhibition layer can be adjusted, for example, by material described later that configures the sebum attachment inhibition layer, and by minute unevenness on the surface of the sebum attachment inhibition layer.

The surface free energy of the sebum attachment inhibition layer can be determined by measuring contact angles with three or more types of liquid agents whose surface free energy are known, and calculating the critical surface free energy with Zisman plot.

The sebum attachment inhibition layer can be formed with material containing a fluorine-containing compound.

A material that configures the sebum absorption and diffusion layer or a compound that can link to oil-absorbing fine particles described later can be used as the fluorine-containing compound. The fluorine-containing compound includes, for example, a conventionally known silane coupling agent containing fluorine, such as alkoxysilane having a fluoride functional group perfluoropolyether structure.

The sebum attachment inhibition layer 2 may be one in which an entire plane of the sebum absorption and diffusion layer is coated with a film derived from the fluorine-containing compound with a film thickness allowing generation of defects, or one in which a film derived from the fluorine-containing compound has grooves and/or holes, and a portion of the sebum absorption and diffusion layer 3 is exposed from a gap in the film derived from the fluorine-containing compound.

Figure 3:
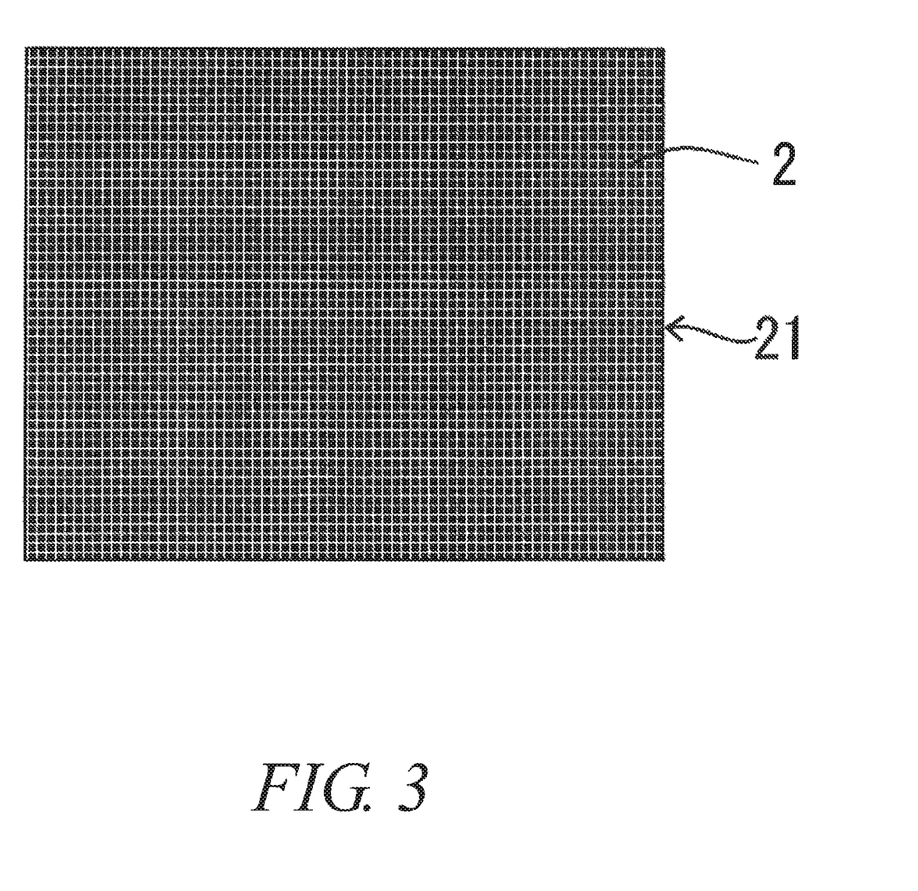
FIG. 3 is a plan view showing an example of a sebum attachment inhibition layer with grooves formed thereon.

FIG. 3 shows an example of a sebum attachment inhibition layer having grooves formed thereon.

Moreover, in case the sebum attachment inhibition layer 2 has a gap 21, the sebum attached to the sebum attachment inhibition layer is repelled by the sebum attachment inhibition layer and passes through to the sebum attachment inhibition layer side through the gap 21, since the sebum cannot stay on the sebum attachment inhibition layer. Therefore, scattering of light caused by the sebum is suppressed.

Figure 4:
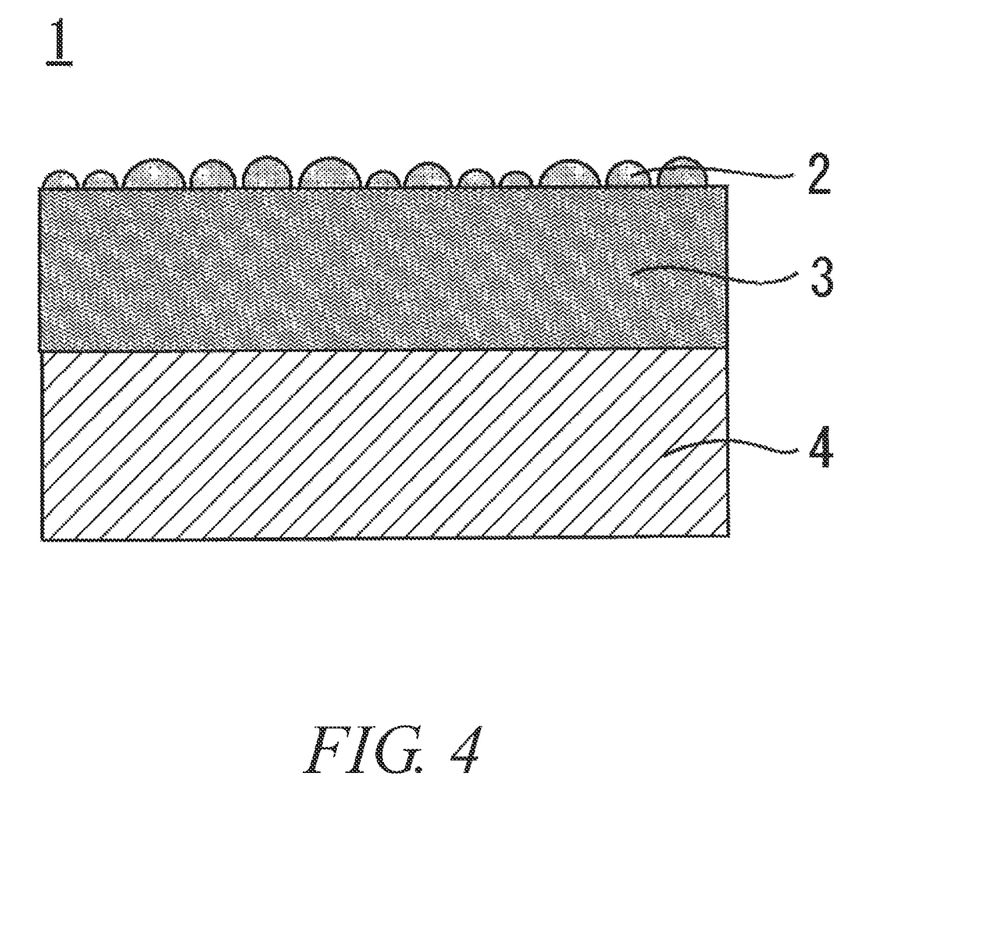
FIG. 4 is a cross sectional view showing another example of a stain disappearing laminate of the present invention.

Furthermore, the sebum attachment inhibition layer 2 is preferably one that protrudes from the sebum absorption and diffusion layer, as shown in FIG. 4.

Since the sebum attachment inhibition layer 2 protrudes from the sebum absorption and diffusion layer 3 and has an inclined plane toward the sebum absorption and diffusion layer 3, an area for sebum 5 to be attached is reduced, and the sebum attached to the sebum attachment inhibition layer 2 can easily move to the gap 21, thereby scattering of light is rapidly reduced.

The sebum attachment inhibition layer with a gap may be formed, for example, by a method of forming a gap by drawing with a laser or burning with ultraviolet ray after protecting with a photo mask, after forming a film of the sebum attachment inhibition layer, or by a method of depositing droplets sprayed by spray coating in a dotted manner.

Moreover, the sebum attachment inhibition layer protruded from the sebum absorption and diffusion layer may be formed by a method of forming a film of the sebum attachment inhibition layer with a large thickness and forming the gap, or by dispersing oil absorbing fine particles coated with the fluorine-containing compound into coating liquid of the sebum absorption and diffusion layer, and exposing the fine particles on the surface of the coated film of the sebum absorption and diffusion layer by making use of the repellency of the fluorine-containing compound.

The film derived from the fluorine-containing compound has a film thickness of preferably 15 nm or less, and is preferably a monomolecular film. With the film thickness of the film derived from the fluorine-containing compound being 15 nm or less, a molecular level defect is generated and the sebum is gradually taken into the sebum absorption and diffusion layer. Moreover, together with the surface free energy in the above range, the attached sebum rapidly passes through to the sebum absorption and diffusion layer side. The monomolecular film of the fluorine-containing compound can be formed by vapor deposition.

When the film thickness of the sebum attachment inhibition layer is 20 nm or more, sebum cannot pass through, it is necessary to physically make a defect portion.

The film thickness of the sebum absorption and diffusion layer can be determined with fluorine element concentration detected in a depth direction, by performing X-ray element analysis with ion drilling (XPS).

Sebum Absorption and Diffusion Layer

The sebum absorption and diffusion layer 3 has affinity for sebum, and absorbs and diffuses the sebum within the layer itself. The layer contains polymer material having a three-dimensional network structure, and may have oil absorbing fine particles if necessary.

Figure 5:
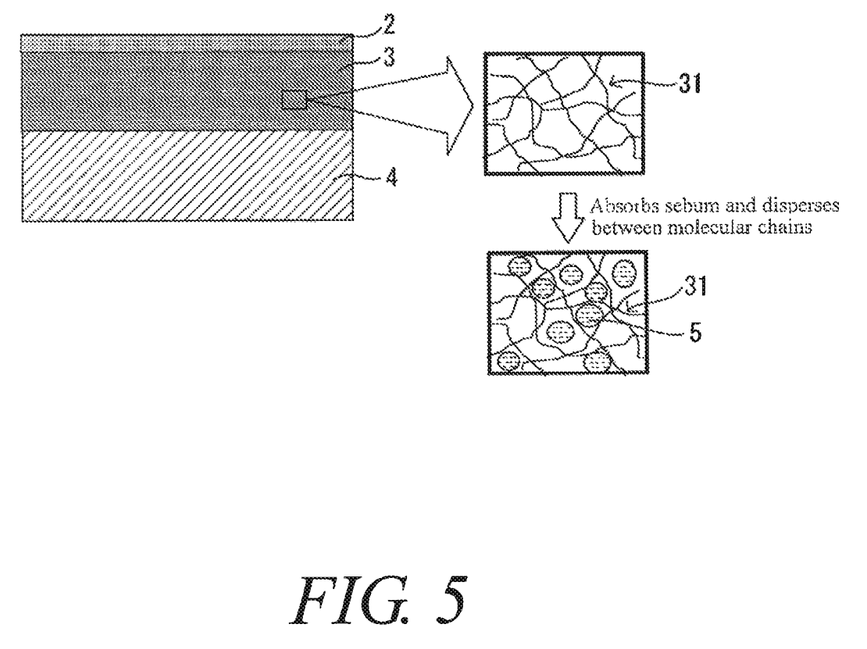
FIG. 5 is a diagram describing an effect of a polymer material of a sebum absorption and diffusion layer.

The polymer material has affinity for sebum. FIG. 5 shows an enlarged view of the sebum absorption and diffusion layer. As shown in FIG. 5, the polymer material allows the sebum enter a micropore between molecular chains of the three-dimensional network structure, and absorbs and diffuses the sebum to hold it. Since the polymer material of the three-dimensional network structure has a point of cross-linking, it is not dissolved even when the sebum enters the micropore.

Silicone elastomer can be used as the polymer material, including, for example, polydimethylsiloxane (PDMS), methyl vinyl silicone elastomer, methyl phenyl silicone elastomer, fluorosilicone elastomer, or copolymer thereof or methyl methacrylate-polydimethylsiloxane copolymer.

One type of these material may be used alone, or two or more types may be used in combination.

The surface free energy of the sebum absorption and diffusion layer is preferably greater than the surface free energy of the sebum attachment inhibition layer. With the surface free energy being closer to the sebum than the sebum attachment inhibition layer, the sebum absorption and diffusion layer has higher affinity for the sebum than the sebum attachment inhibition layer, and thus the sebum attached to the sebum attachment inhibition layer moves to the sebum absorption and diffusion layer more easily.

More specifically, the surface free energy of the sebum absorption and diffusion layer is preferably 18 to 50 mJ/m$^2$, and more preferably 30 to 50 mJ/m$^2$.

As described above, the surface free energy of the sebum is around 30 mJ/m$^2$, and with the surface free energy of the sebum absorption and diffusion layer being within the above range, the layer will have high affinity for sebum, which will facilitate absorption and diffusion and increase the absorption speed of the sebum.

The surface free energy of the sebum absorption and diffusion layer can be measured as with the surface free energy of the sebum attachment inhibition layer, by peeling off the sebum attachment inhibition layer formed on the surface of the sebum absorption and diffusion layer to expose the sebum absorption and diffusion layer.

Examples of the oil absorbing fine particles include inorganic porous fine particles, such as silica, magnesium carbonate, calcium carbonate and calcium phosphate.

The content of the oil absorbing fine particles in the sebum absorption and diffusion layer is not particularly limited, however since a haze value may increase with a large content of the oil absorbing fine particles, the content is preferably 10 mass % or less, if transparency is required.

Base Material

The base material 4 is not particularly limited, and conventionally known glass, resins, metals and the like may be used. Transparent base material can be suitably used for optical components such as image display devices and touch panels.

Stain Disappearing Laminate

The stain disappearing laminate preferably has a surface roughness (Ra) of 10 to 200 nm, more preferably 15 nm or more.

With the surface roughness (Ra) of 10 nm or more, the amount of sebum that attaches to the sebum attachment inhibition layer decreases, and with the surface roughness being 200 nm or less, scattering of light due to the surface roughness is prevented, and thus visibility is improved.

The surface roughness (Ra) of the stain disappearing laminate can be adjusted, for example, by the oil absorbing fine particles added to the sebum absorption and diffusion layer, and by the gaps in the sebum attachment inhibition layer.

The surface roughness (Ra) of the stain disappearing laminate can be measured by an atomic force microscope (AFM).

Moreover, the stain disappearing laminate preferably has a haze value (Hz) of 3% or less. With the haze value being within the above range, the stain disappearing laminate satisfies a transparency required for automobile components and optical components such as image display devices.

The haze value can be measured according to JIS K7136 with a haze/transmittance meter (Murakami Color Research Laboratory).

Image Display Device

An image display device of the present invention comprises the stain disappearing laminate. With the image display device comprising the stain disappearing laminate, it is possible to prevent sebum stains such as fingerprints for a long term, and restore visibility.

Examples of the image display device include a mobile phone, a personal computer, a ticket vending machine, a bank terminal, a touch panel, an electronic blackboard and the like.

Automobile Component

The automobile component of the present invention comprises the stain disappearing laminate. With the automobile component comprising the antifouling structure, it is possible to prevent sebum stains such as fingerprints for a long term, and restore visibility/aesthetic properties.

Examples of the automobile component include transparent components such as a touch panel for a car navigation system, a camera lens, a mirror, a glass window, a meter panel and a window panel, as well as opaque components using a decorative panel, such as a console panel and a door panel, whose aesthetic property deteriorates due to sebum stains.

EXAMPLES

Hereinafter, the present invention will be described in more detail with examples. However, the present invention is not limited to the following examples.

Example 1

Liquid A and Liquid B of polydimethylsiloxane (Shin-Etsu Silicone: Two-components type silicone rubber: KE-109E) were homogenously mixed to prepare a sebum absorption and diffusion layer coating liquid.

The sebum absorption and diffusion layer coating liquid was applied on a transparent glass base material by using a bar coater so that a dried film thickness of 10 μm is obtained, and was heated to dry for one hour at 150° C. to form a sebum absorption and diffusion layer.

Alkoxysilane having a perfluoropolyether structure (manufactured by Daikin Industries: OPTOOL DSX) was deposited on a surface of the sebum absorption and diffusion layer under a condition, in which a film thickness of 5 nm is obtained, by vacuum deposition, to form a sebum attachment inhibition layer made of a monomolecular film of a fluorine-containing compound, thus obtaining a stain disappearing laminate.

Example 2

Liquid A and Liquid B of methyl methacrylate-polydimethylsiloxane copolymer (manufactured by Taisei Fine Chemical) were homogenously mixed to prepare a sebum absorption and diffusion layer coating liquid.

The stain disappearing laminate was obtained as with Example 1, except that the sebum absorption and diffusion layer coating liquid was applied on a transparent glass base material by using a bar coater so that a dried film thickness of 10 μm is obtained, and was heated to dry for one hour at 150° C. to form a sebum absorption and diffusion layer.

Example 3

Alkoxysilane having a perfluoropolyether structure (manufactured by Daikin Industries: OPTOOL DSX) was deposited on the surface of the sebum absorption and diffusion layer under a condition, in which a film thickness of 10 nm is obtained, by vacuum deposition, to form a sebum attachment inhibition layer made of a fluorine-containing compound, thus obtaining a stain disappearing laminate.

Example 4

Liquid A and Liquid B of methyl methacrylate-polydimethylsiloxane copolymer (manufactured by Taisei Fine Chemical) were homogenously mixed, and 3 mass % of colloidal silica (average particle size 50 nm; manufactured by Nissan Chemical: SNOWTEX: ST-50) with respect to a solid content of the methyl methacrylate polydimethylsiloxane copolymer was kneaded and dispersed to prepare a sebum absorption and diffusion layer coating liquid.

The stain disappearing laminate was obtained as with Example 1, except that the sebum absorption and diffusion layer coating liquid was applied on a transparent glass base material by using a bar coater so that a dried film thickness of 10 µm is obtained, and was heated to dry for one hour at 150° C. to form a sebum absorption and diffusion layer.

Example 5

A surface of colloidal silica (average particle size 50 nm; manufactured by Nissan Chemical: SNOWTEX: ST-50) was treated with perfluorosilane, to obtain hydrophobic colloidal silica.

Liquid A and Liquid B of methyl methacrylate-polydimethylsiloxane copolymer (manufactured by Taisei Fine Chemical) were homogenously mixed, and 6 mass % of the hydrophobic colloidal silica with respect to a solid content of the methyl methacrylate-polydimethylsiloxane copolymer was kneaded and dispersed to prepare coating liquid.

The coating liquid was applied on a transparent glass base material by using a bar coater so that a dried film thickness of 10 µm is obtained, and after exposing the hydrophobic colloidal silica on the surface by leaving for 15 minutes, this was heated to dry for one hour at 150° C., to obtain a stain disappearing laminate having a sebum attachment inhibition layer of hydrophobic colloidal silica formed on the sebum absorption and diffusion layer.

Example 6

Liquid A and Liquid B of polydimethylsiloxane (Shin-Etsu Silicone: Two-components type silicone rubber: KE-109E) were homogenously mixed, and 4 mass % of the hydrophobic colloidal silica with respect to a solid content of the polydimethylsiloxane was kneaded and dispersed to prepare coating liquid.

The coating liquid was applied on a transparent glass base material by using a bar coater so that a dried film thickness of 10 µm is obtained, and after exposing the hydrophobic colloidal silica on the surface by leaving for 15 minutes, this was heated to dry for one hour at 150° C., to obtain a stain disappearing laminate having a sebum attachment inhibition layer of hydrophobic colloidal silica formed on the sebum absorption and diffusion layer.

Example 7

A stain disappearing laminate was obtained as with Example 6 in which a sebum attachment inhibition layer of hydrophobic colloidal silica is formed on a sebum absorption and diffusion layer, except that the added amount of the hydrophobic colloidal silica is 3 mass %.

Example 8

A stain disappearing laminate was obtained as with Example 6 in which a sebum attachment inhibition layer of hydrophobic colloidal silica is formed on a sebum absorption and diffusion layer, except that the added amount of the hydrophobic colloidal silica is 8 mass %.

Example 9

The surface of the stain disappearing laminate prepared in Example 1 was covered by a photomask with a pitch of 2 mm and a line width of 1.5 mm, vacuum ultraviolet ray (wavelength 180 nm: Eximer lamp unit manufactured by Ushio Inc.) was irradiated inside a vacuum chamber of 50 Torr or less for 20 minutes, to obtain a stain disappearing laminate having a sebum attachment inhibition layer with 0.5 mm grooves at 1.5 mm intervals.

Comparative Example 1

A stain disappearing laminate was obtained as with Example 2, except that no sebum attachment inhibition layer was formed.

Comparative Example 2

Alkoxysilane having a perfluoropolyether structure (manufactured by Daikin Industries: OPTOOL DSX) was deposited on the surface of a transparent glass base material under a condition, in which a film thickness of 20 nm is obtained, by vacuum deposition, to form a sebum attachment inhibition layer made of a fluorine-containing compound, thus obtaining a stain disappearing laminate.

Comparative Example 3

0.1 mass % of nitric acid was added to a 1 mass % solution of decyltriethoxysilane in ethanol, this was stirred for one hour and then directly applied on a transparent glass base material. Then, dried for one hour at 100° C., and an excess amount was washed out with ethanol to form a sebum attachment inhibition layer, thus obtaining a stain disappearing laminate.

Evaluation

Fingerprints were attached to the stain disappearing laminates of Examples 1 to 9 and Comparative Examples 1 to 3, and changes over time were evaluated by visual observation based on the following criteria. The evaluation results are shown in Table 1 together with the configuration of the stain disappearing laminates.

4: Fingerprints stand out (Fingerprint shapes are maintained);
3: Fingerprint marks stand out (Fingerprint shapes are unclear);
2: Attached objects stand out depending on viewed angle;
1: Attached objects can be recognized if viewed carefully;
0: No mark of the attached objects can be recognized.

TABLE 1

| | Base material | Sebum absorption and diffusion layer | | | Sebum attachment inhibition layer | |
| | | Material | Film thickness nm | Surface free energy mJ/m2 | Material | Film thickness nm |
| --- | --- | --- | --- | --- | --- | --- |
| Ex. 1 | Glass | PDMS | 10000 | 21 | Fluorine-containing compound | 5 |
| Ex. 2 | Glass | MMA-PDMS | 10000 | 47 | Fluorine-containing compound | 5 |
| Ex. 3 | Glass | MMA-PDMS | 10000 | 45 | Fluorine-containing compound | 10 |

TABLE 1-continued

| | | | | | | |
|---|---|---|---|---|---|---|
| Ex. 4 | Glass | MMA-PDMS | 10000 | 38 | Fluorine-containing compound + colloidal silica | 5 |
| Ex. 5 | Glass | MMA-PDMS | 10000 | 34 | Fluorine-containing compound + colloidal silica | — |
| Ex. 6 | Glass | PDMS | 10000 | 19 | Fluorine surface processed colloidal silica | — |
| Ex. 7 | Glass | PDMS | 10000 | 23 | Fluorine surface processed colloidal silica | — |
| Ex. 8 | Glass | PDMS | 10000 | 21 | Fluorine surface processed colloidal silica | — |
| Ex. 9 | Glass | PDMS | 10000 | 21 | Fluorine-containing compound | 5 |
| C. Ex 1 | Glass | MMA-PDMS | 10000 | 47 | — | — |
| C. Ex 2 | Glass | — | — | — | Fluorine-containing compound | 20 |
| C. Ex 3 | Glass | — | — | — | Decyltriethoxysilane | 4 |

| | Sebum attachment inhibition layer | | | Evaluation | | | | | |
|---|---|---|---|---|---|---|---|---|---|
| | Colloidal silica added amount | Surface roughness Ra | Surface free energy | | Fingerprint disappearing confirmation test elapse time (hr) | | | | Haze |
| | mass % | nm | mJ/m2 | Patterning | Initial | 0.5 | 1 | 3 | 8 | (%) |
| Ex. 1 | — | 5 | 13.4 | No | 3 | 2 | 1 | 0 | 0 | 0.2 |
| Ex. 2 | — | 3 | 13.5 | No | 3 | 2 | 0 | 0 | 0 | 0.2 |
| Ex. 3 | — | 4 | 12.1 | No | 3 | 2 | 0 | 0 | 0 | 0.3 |
| Ex. 4 | 3 | 21 | 12.0 | No | 3 | 1 | 0 | 0 | 0 | 0.4 |
| Ex. 5 | 6 | 22 | 15.5 | No | 3 | 1 | 0 | 0 | 0 | 1.7 |
| Ex. 6 | 4 | 19 | 16.3 | No | 3 | 1 | 1 | 0 | 0 | 0.7 |
| Ex. 7 | 3 | 20 | 17.6 | No | 3 | 1 | 1 | 0 | 0 | 0.8 |
| Ex. 8 | 8 | 20 | 14.4 | No | 3 | 1 | 1 | 0 | 0 | 2.5 |
| Ex. 9 | — | 5 | 13.4 | Yes | 3 | 1 | 0 | 0 | 0 | 0.7 |
| C. Ex 1 | — | — | — | No | 4 | 3 | 2 | 1 | 0 | 0.5 |
| C. Ex 2 | — | 4 | 11.2 | No | 4 | 4 | 4 | 4 | 4 | 0.1 |
| C. Ex 3 | — | 2 | 27.1 | No | 4 | 4 | 3 | 3 | 3 | 0.1 |

PDMS: Polydimethylsiloxane
MMA-PDMS: Methyl methacrylate-polydimethylsiloxane copolymer
Fluoride-containing compound: Alkoxysilane having a perfluoropolyether structure
Ex.: Example; C. Ex.: Comparative Example Example 2 required a shorter time than Comparative Example 1 for the fingerprints to disappear, and the effect of the sebum attachment inhibition layer could be confirmed. Moreover, Examples 4 to 8 having a surface roughness (Ra) of not less than 15 nm had a fewer amount of sebum attached than Examples 1 to 3, and their visibility was improved. Furthermore, Examples 2 to 5 with the surface free energy of the sebum absorption and diffusion layer being 30 to 50 mJ/m$^2$ had high affinity for sebum, and the absorption rate of sebum was fast.

In Example 9, which has gaps formed on the sebum attachment inhibition layer by patterning, moving of sebum to the sebum absorption and diffusion layer was facilitated.

REFERENCE SIGNS LIST

1 Stain disappearing laminate
2 Sebum attachment inhibition layer
21 Gap
3 Sebum absorption and diffusion layer
31 Polymer chain
4 Base material
5 Sebum

The invention claimed is:

1. A stain disappearing laminate comprising:
    a laminated layer structure including a sebum absorption and diffusion layer comprising a polymer material with a three-dimensional network structure containing silicone elastomer, and a sebum attachment inhibition layer formed with a fluorine-containing compound, laminated on a base material,
    wherein the laminated layer structure has a laminate order of the base material, the sebum absorption and diffusion layer, and the sebum attachment inhibition layer,
    wherein the sebum attachment inhibition layer has a thickness of 15 nm or less, and repels sebum and reduces attachment of sebum, as well as allows attached sebum to pass through to a sebum absorption and diffusion layer side, and
    wherein the sebum absorption and diffusion layer absorbs the sebum passed through the sebum attachment inhibition layer and diffuses the sebum within the sebum absorption and diffusion layer itself.

2. The stain disappearing laminate according to claim 1, wherein a surface free energy of the sebum attachment inhibition layer is within a range of 12 to 20 mJ/m$^2$.

3. The stain disappearing laminate according to claim 2, wherein a surface free energy of the sebum absorption and diffusion layer is greater than a surface free energy of the sebum attachment inhibition layer.

4. The stain disappearing laminate according to claim 3, wherein a surface free energy of the sebum absorption and diffusion layer is in a range of 18 to 50 mJ/m$^2$.

5. The stain disappearing laminate according to claim 1, wherein the sebum attachment inhibition layer comprises a film having a gap, and
    a portion of the sebum absorption and diffusion layer is exposed from the gap.

6. The stain disappearing laminate according to claim 1, wherein the sebum attachment inhibition layer is disposed such that the sebum attachment inhibition layer protrudes from the sebum absorption and diffusion layer.

7. The stain disappearing laminate according to claim 1, wherein the sebum attachment inhibition layer is a monomolecular film derived from the fluorine-containing compound.

8. The stain disappearing laminate according to claim 1, wherein the base material is transparent.

9. The stain disappearing laminate according to claim 1, wherein a surface roughness (Ra) is in a range of 10 to 200 nm.

10. The stain disappearing laminate according to claim 1, wherein a haze value (Hz) is 3% or less.

11. An image display device comprising a stain disappearing laminate on a surface of the image display device, wherein the stain disappearing laminate is the stain disappearing laminate according to claim 1.

12. An automobile component comprising a stain disappearing laminate on a surface of the automobile component, wherein the stain disappearing laminate is the stain disappearing laminate according to claim 1.

\* \* \* \* \*